United States Patent
Dardis, II et al.

(10) Patent No.: US 7,695,172 B2
(45) Date of Patent: Apr. 13, 2010

(54) THERMALLY CONDUCTIVE PANEL

(75) Inventors: John T. Dardis, II, Everett, WA (US);
Aucheun Saechao, Everett, WA (US);
Aaron L. Castillo, Seattle, WA (US)

(73) Assignee: The Boeing Company, Chicago, IL (US)

( * ) Notice: Subject to any disclaimer, the term of this patent is extended or adjusted under 35 U.S.C. 154(b) by 407 days.

(21) Appl. No.: 11/479,646

(22) Filed: Jun. 30, 2006

(65) Prior Publication Data

US 2008/0001557 A1 Jan. 3, 2008

(51) Int. Cl.
*F21V 21/00* (2006.01)
*F21V 29/00* (2006.01)

(52) U.S. Cl. ................................. 362/471; 362/294

(58) Field of Classification Search .......... 362/294, 362/373, 459, 470–472

See application file for complete search history.

(56) References Cited

U.S. PATENT DOCUMENTS

| | | | | |
|---|---|---|---|---|
| 2,994,110 A | * | 8/1961 | Hardy | 264/112 |
| 4,061,812 A | * | 12/1977 | Gilwee et al. | 428/117 |
| 4,799,631 A | * | 1/1989 | Humphries et al. | 244/118.5 |
| 5,347,434 A | * | 9/1994 | Drake | 362/472 |
| 5,422,794 A | * | 6/1995 | Drake | 362/471 |
| 5,601,034 A | * | 2/1997 | Tao et al. | 105/423 |
| 5,677,603 A | | 10/1997 | Speirs et al. | |
| 5,816,534 A | * | 10/1998 | Schumacher | 244/119 |
| 5,876,831 A | * | 3/1999 | Rawal | 428/117 |
| 6,051,302 A | | 4/2000 | Moore | |
| 6,667,089 B1 | * | 12/2003 | Barker | 428/73 |
| 6,834,159 B1 | | 12/2004 | Schramm | |
| 7,404,650 B2 | * | 7/2008 | Ano et al. | 362/145 |
| 2005/0002197 A1 | * | 1/2005 | Kohlmeier-Beckmann et al. | 362/470 |
| 2006/0006821 A1 | | 1/2006 | Singer et al. | |
| 2009/0072086 A1 | * | 3/2009 | Smith et al. | 244/119 |

FOREIGN PATENT DOCUMENTS

| | | |
|---|---|---|
| EP | 1493666 A1 | 5/2005 |
| EP | 1493666 A1 | 1/2008 |
| JP | 2003326622 | 11/2003 |

OTHER PUBLICATIONS

PCT/US20071012444—International Searching Authority—Invitation to Pay Additional Fees, dated Dec. 6, 2007, 10 pages.
Database WPI Week 200422 Derwent Publications Ltd., London, GB: AN 2004-230606 XP002458185 & JP 2003 326622 A (Mitsubishi Electric Corp) Nov. 19, 2003 abstract.

* cited by examiner

*Primary Examiner*—John A Ward
(74) *Attorney, Agent, or Firm*—Klintworth & Rozenblat IP LLC (57) ABSTRACT

The present application discloses a thermally conductive panel having a honeycomb core interior portion and a non-metallic thermally conductive face sheet. The honeycomb core interior portion extends between a first end portion and a second end portion of the panel. The face sheet extends across a surface of the honeycomb core interior portion. In operation, the panel is in thermal communication with a heat source.

26 Claims, 10 Drawing Sheets

THERMALLY CONDUCTIVE PANEL

BACKGROUND

The present application relates generally to systems for dissipating heat. In some applications, the present application relates to passenger vehicle illumination systems, such as ceiling mounted lights for passenger vehicle cabins.

Passenger vehicle cabins, such as aircraft cabins, typically require illumination elements to enable persons inside the vehicle to see. Conventionally, these illumination elements have been mounted on walls or stowage bins. The heat generated by the illumination elements and their power modules and controllers has necessitated separate dedicated heat sinks, which add weight to the vehicle.

Mounting the illumination elements on the stowage bins of aircraft, for example, has been problematic because of the additional weight caused by these components, which additional weight leads to higher loads and heavier panel buildups, and because the stowage bin arrangements vary depending upon the aircraft cabin layout. This variability of the stowage bin arrangements has caused the set of illumination elements to vary from aircraft to aircraft. It is desirable to have a system for supporting light fixtures that can remain constant from vehicle to vehicle, or that reduces the total weight or complexity of the system.

SUMMARY

The above-mentioned drawbacks associated with existing systems are addressed by embodiments of the present application, which will be understood by reading and studying the following specification.

In one embodiment, a thermally conductive panel comprises a honeycomb core interior portion extending between a first end portion and a second end portion of the panel. The panel further comprises a non-metallic thermally conductive face sheet extending across a surface of the honeycomb core interior portion. The face sheet has a thermal conductivity along at least one axis of at least about 25 Watts per meter-Kelvin.

In another embodiment, an illumination system comprises a ceiling panel comprising a thermally conductive material, the ceiling panel being mounted onto a stowage bin or wall of a passenger vehicle cabin with one or more ceiling panel mounts. The illumination system further comprises a plurality of light-emitting diodes mounted directly onto the ceiling panel, such that the light-emitting diodes are in contact with the thermally conductive material.

In another embodiment, a passenger vehicle comprises a honeycomb core panel, a non-metallic thermally conductive face sheet extending across a surface of the honeycomb core panel, and a heat source in thermal communication with the face sheet.

These and other embodiments of the present application will be discussed more fully in the detailed description. The features, functions, and advantages can be achieved independently in various embodiments of the present application, or may be combined in yet other embodiments.

BRIEF DESCRIPTION OF DRAWINGS

Like reference numbers and designations in the various drawings indicate like elements.

DETAILED DESCRIPTION

In the following detailed description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that various changes may be made without departing from the spirit and scope of the present invention. The following detailed description is, therefore, not to be taken in a limiting sense.

Figure 1:
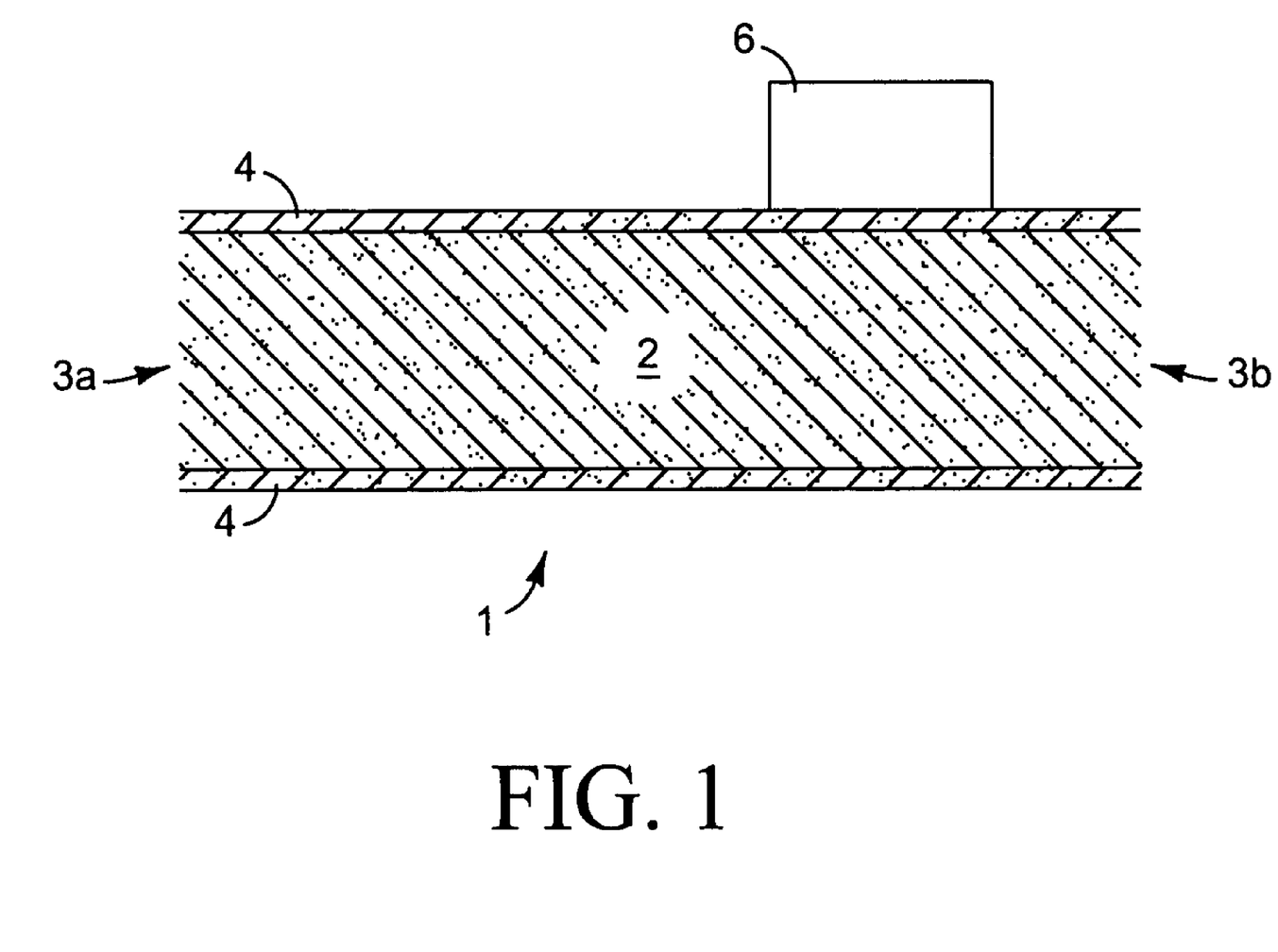
FIG. 1 shows a cross-sectional view of a panel with a core material, two face sheets, and a heat source.

FIG. 1 shows a thermally conductive panel 1 and a heat source 6. The thermally conductive panel 1 comprises a core material 2, and one or more face sheets 4. In the illustrated embodiment, the panel 1 comprises two face sheets 4.

The core material 2 may comprise a composite honeycomb panel, such as a honeycomb core interior panel or portion thereof, or any other lightweight material with sufficient rigidity to support the face sheet(s) 4 and heat source 6. The core material 2 is preferably thin to minimize its weight and volume, and extends from a first end portion 3a to a second end portion 3b.

The face sheet 4 comprises a thin material applied to or extending across at least one surface of the core material 2. The face sheet 4 may be made of pitch-based carbon fiber, eGRAF® manufactured by GrafTech International Ltd., or any other material that is non-metallic and thermally conductive. The face sheet 4 may have grains which cause its thermal conductivity to be greatest along a specific axis, such as an axis extending from the first end portion 3a to the second end portion 3b, causing heat to be conducted along the axis between the two end portions 3a, 3b. "Thermally conductive" is used in this application to refer to a material with a thermal conductivity along at least one axis (e.g., bulk conductivity or fiber conductivity) of at least about 25 Watts per meter-Kelvin (25 W·m$^{-1}$·K$^{-1}$).

The heat source 6 may comprise an illumination element such as a light-emitting diode, or any other component that generates heat. In the illustrated embodiment, the heat source 6 is in thermal communication with the top face sheet 4. "Thermal communication" is used in this application to mean a relationship between two components in which a thermally conductive path can be traced between the two components, which includes the situation shown in FIG. 1, in which the two components are in direct contact with each other.

In the embodiment shown in FIG. 1, the combination of the core material 2 and top face sheet 4 acts as both a structural support and a thermal management device for the heat source 6. This advantageously creates a lightweight structure that also minimizes the use of space to support, and dissipate heat from, the heat source 6.

Figure 9:
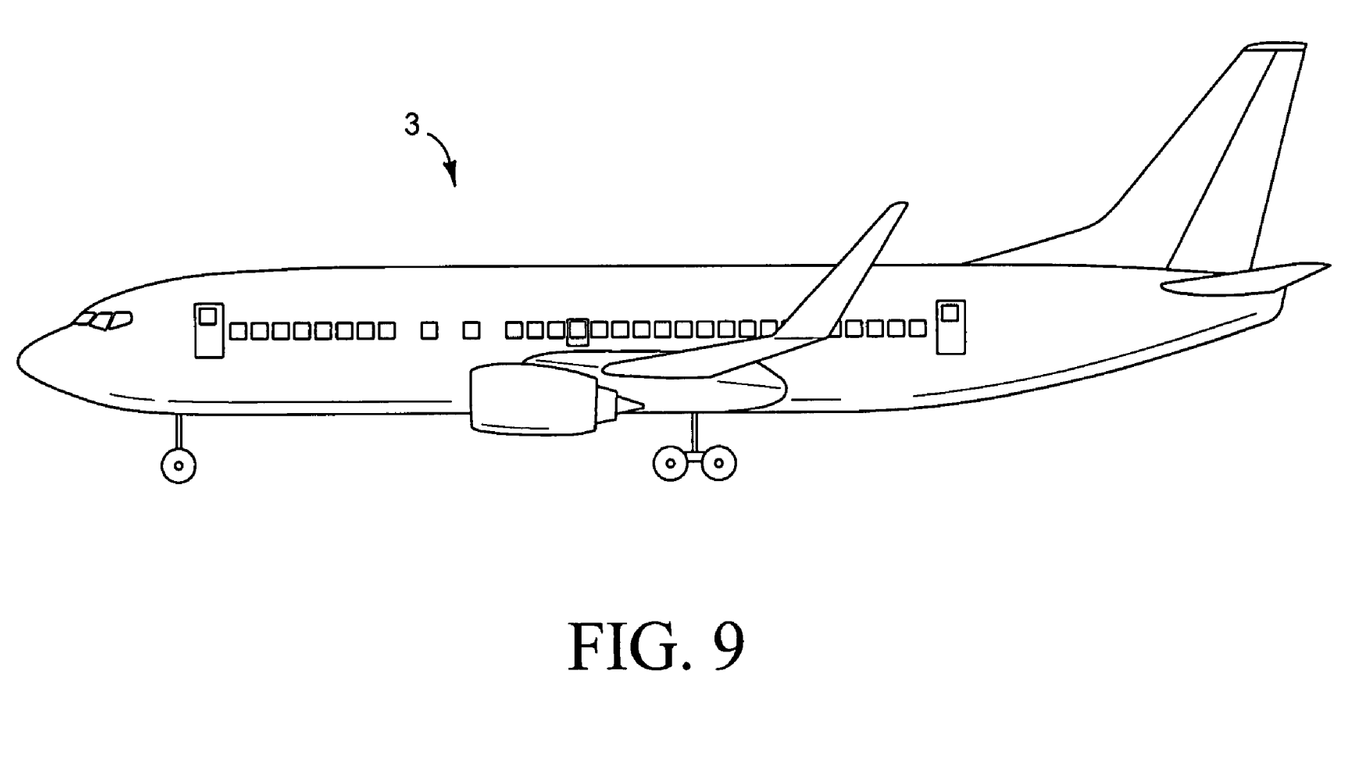
FIG. 9 shows an aircraft which may utilize embodiments of the present application.

In some embodiments, the panel 1 is used as a ceiling panel in the passenger cabin of an aircraft, such as the aircraft 3 shown in FIG. 9, as a radiator to dissipate heat from the heat source 6, such as light-emitting diodes. However, embodiments of the present application could also be used with other aircraft or other passenger vehicles, and could dissipate heat from a wide variety of devices or structures which generate heat, such as, for example, computers, electronic components, mechanical devices, etc. In addition, embodiments of the present application could be used to dissipate heat through structures other than ceiling panels, such as, for example, stowage bin support modules, environmental control systems, areas within flight decks such as control panels, or electronics bay support structures.

In the case of a fleet of aircraft, one advantage of mounting the heat source 6 onto the panel 1 is that the configuration of the panel 1 often tends to be the same from aircraft to aircraft, unlike stowage bin arrangements, which can vary widely depending upon the aircraft cabin layout. Because conventional aircraft cabin illumination systems are mounted on stowage bins, this variability adds undesired cost and complexity to the corresponding illumination system components. Thus, by mounting the heat source 6 directly on the panel 1, the illumination system can be designed with modular components that can be used from aircraft to aircraft, thereby reducing the overall cost and complexity of the system.

The heat source 6 can also be mounted onto the panel 1 and have heat dissipated using fewer components than were needed when the illumination elements 50 were mounted on stowage bins 20 (discussed below in reference to FIG. 2), reducing the amount of weight in the cabin. There is no need to for the panel 1 to use electrically conductive materials, because the heat source 6 may be connected to a power module 60 by wires 70 (discussed below in reference to FIG. 8).

Figure 2:
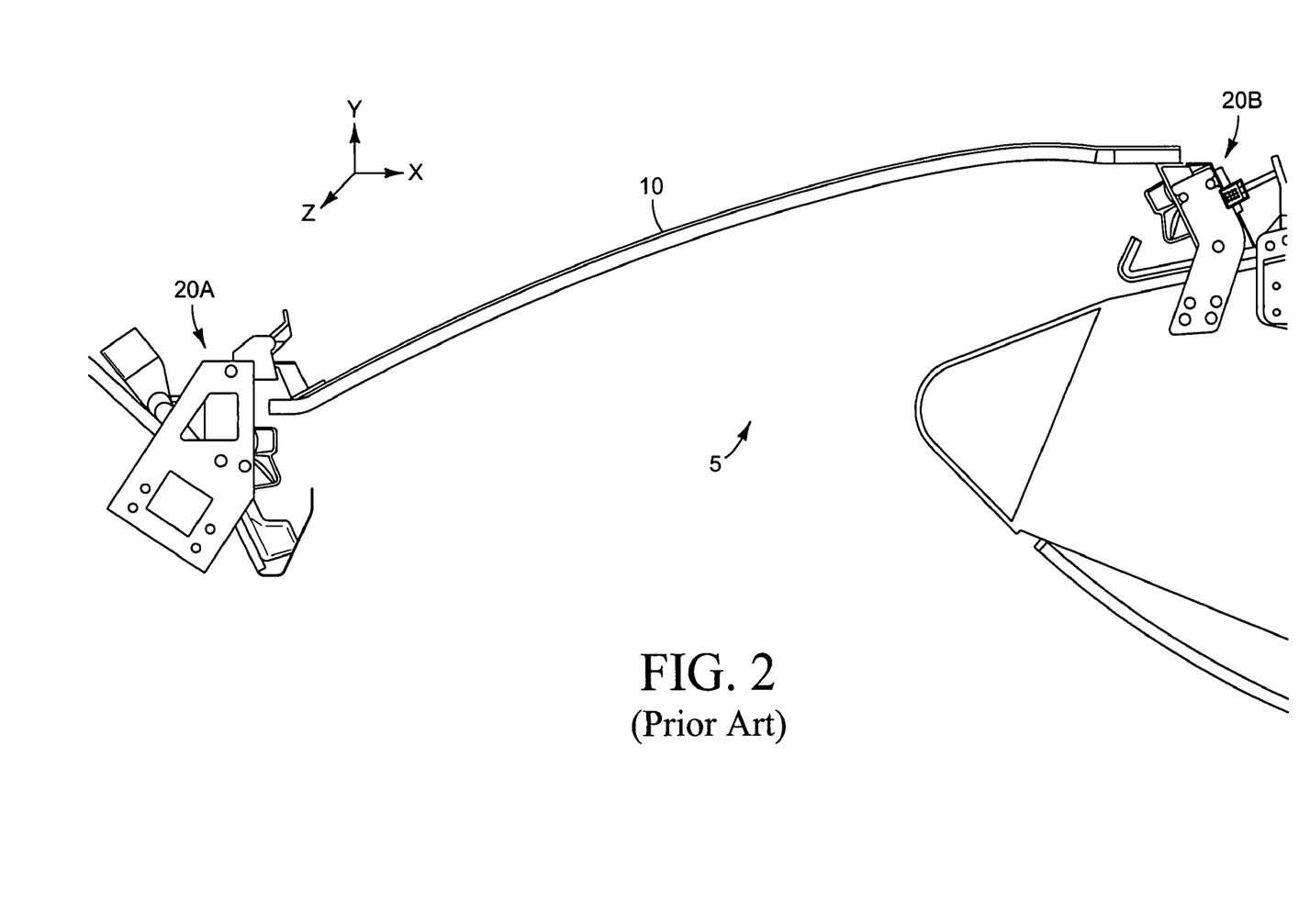
FIG. 2 shows a cross-sectional view of a conventional illumination system for a passenger vehicle cabin, in which illumination elements are attached to stowage bins.

FIG. 2 shows a cross-sectional view of a conventional illumination system 5 within a passenger vehicle cabin, such as an aircraft cabin. The conventional illumination system 5 comprises a plurality of illumination elements 50 (shown in FIG. 3), such as light-emitting diodes (LEDs), mounted onto stowage bins 20. A ceiling panel 10 is interconnected between an outboard row of stowage bins 20A and an inboard row of stowage bins 20B. The ceiling panel 10 is generally flat in a latitudinal direction, z, and generally curved in a longitudinal direction, x, and may comprise a number of individual panels.

Figure 3:
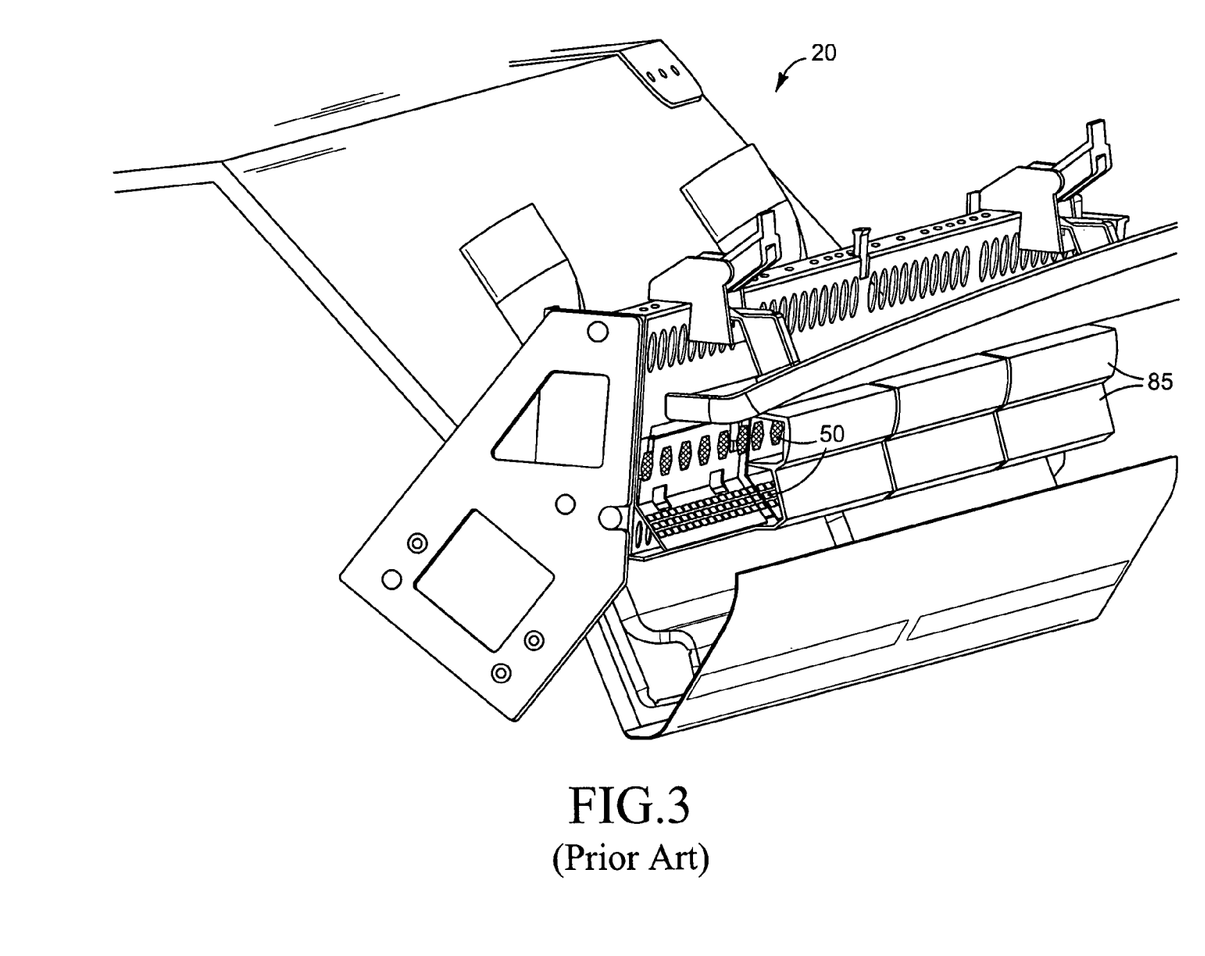
FIG. 3 shows an interior perspective view of the conventional stowage bin with the illumination elements attached to the stowage bin.

FIG. 3 shows an interior perspective view of the conventional stowage bin 20 with the illumination elements 50 attached thereto. As shown in FIG. 3, the conventional illumination system 5 comprises stowage bin lenses 85, which cover the illumination elements 50 on each stowage bin 20.

Figure 4:
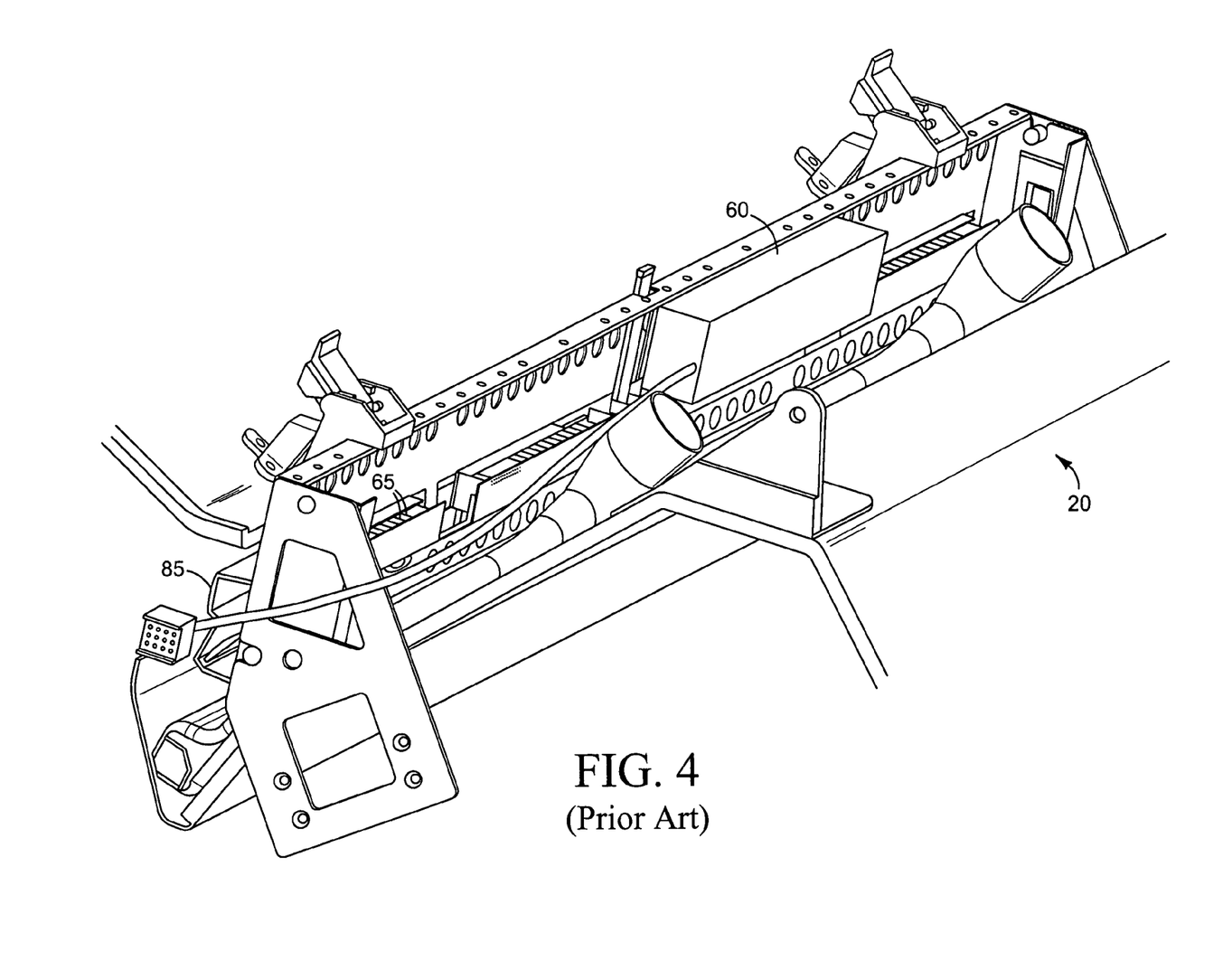
FIG. 4 shows an exterior perspective view of the conventional stowage bin with the illumination elements attached to the stowage bin.

FIG. 4 shows an exterior perspective view of the conventional stowage bin 20 with the illumination elements 50 attached thereto. As shown in FIG. 4, the conventional illumination system 5 further comprises heat sinks 65 and one or more power modules 60 attached to the back of the stowage bin 20. In the illustrated example, the heat sinks 65 comprise aluminum fins, which add undesirable weight and complexity to the illumination system 5.

Figure 5A:
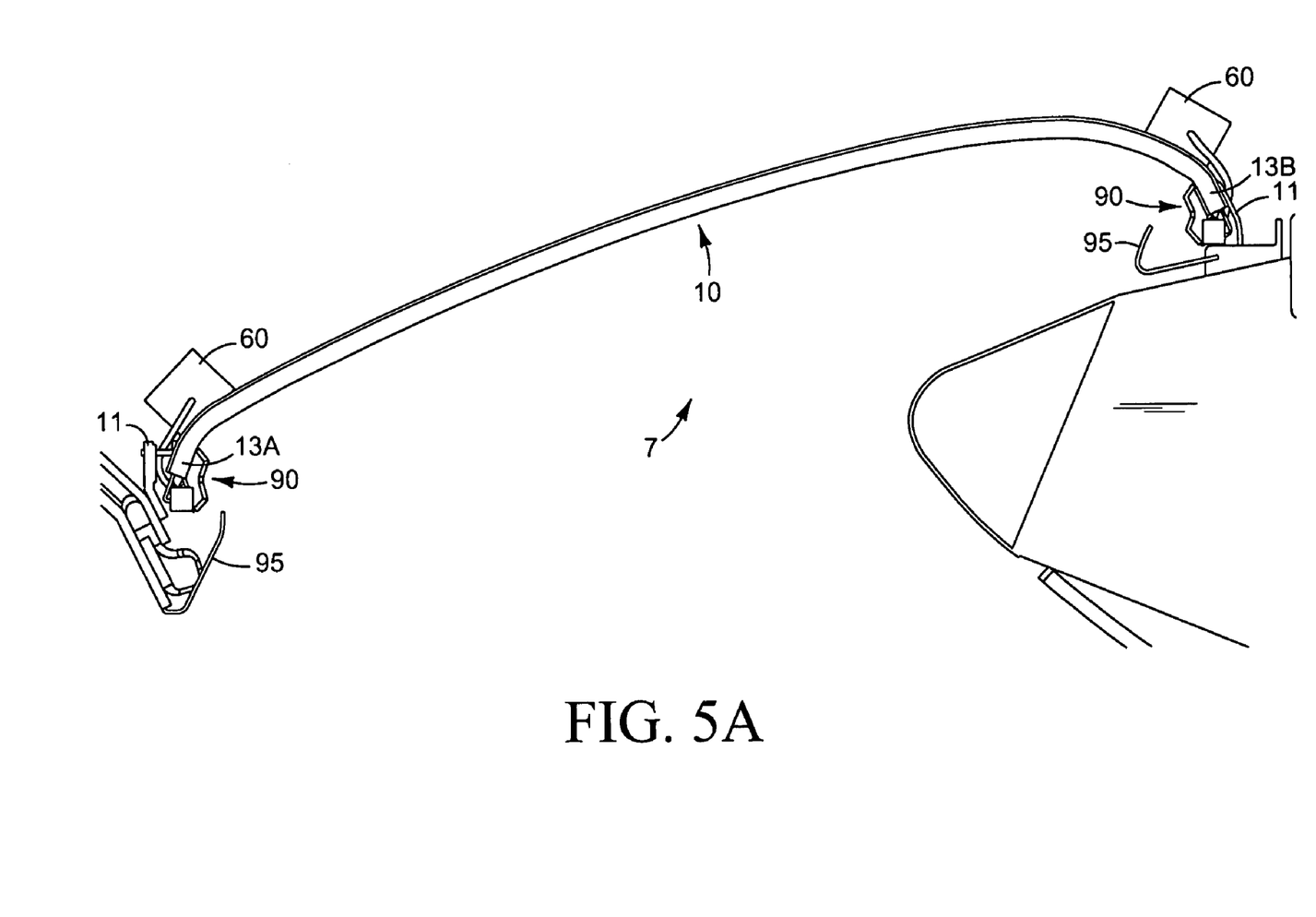
FIG. 5A shows a cross-sectional view of a passenger vehicle cabin, such as an aircraft cabin, with illumination elements attached to a ceiling panel.
Figure 5B:
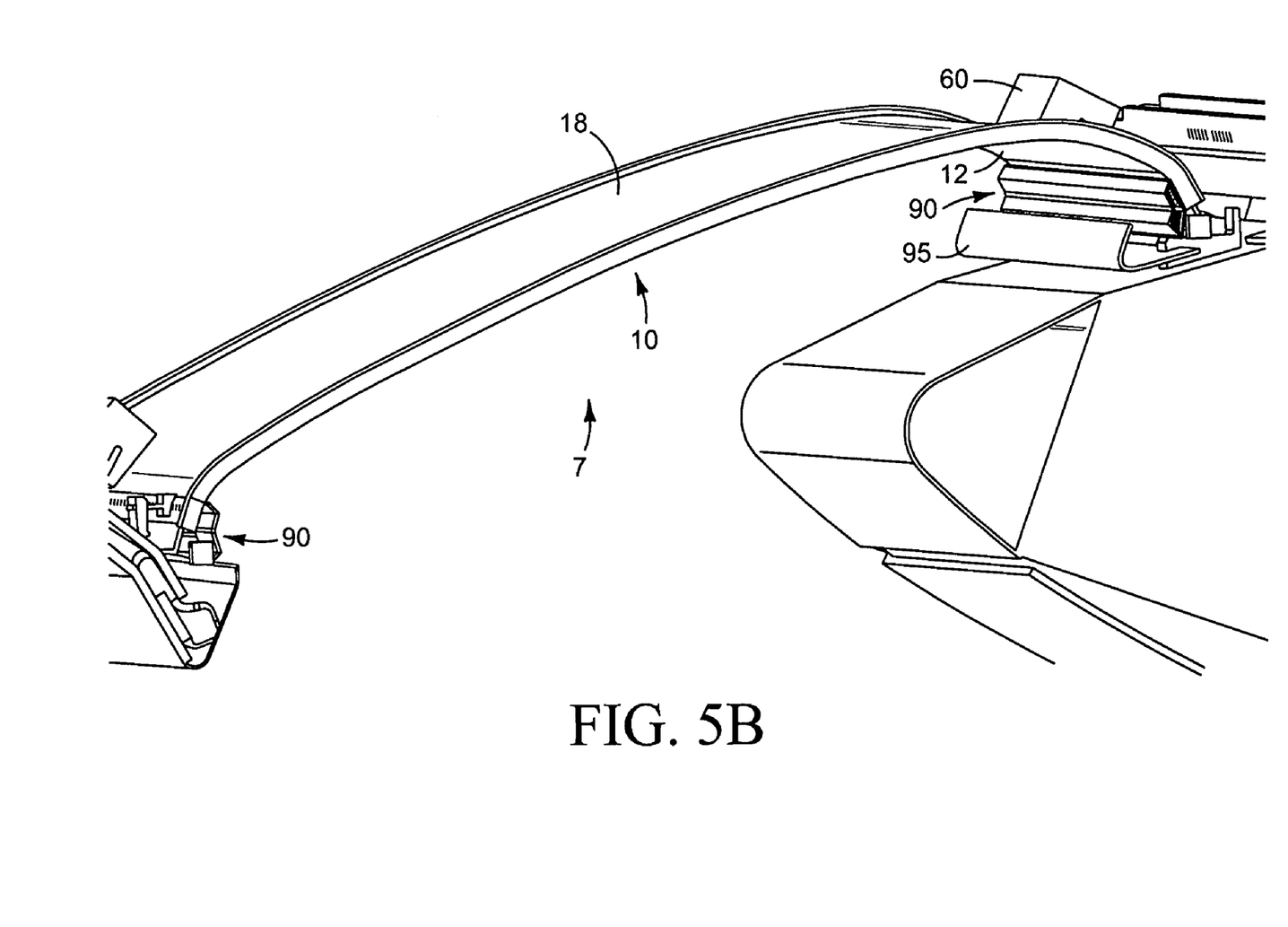
FIG. 5B shows a perspective view of the passenger vehicle cabin with the illumination elements attached to the ceiling panel.

FIGS. 5A and 5B show an illumination system 7 in which the illumination elements 50 (shown in FIG. 7 as a lower horizontal row 52 and an upper horizontal row 54) are mounted directly onto the ceiling panel 10, in accordance with embodiments of the present application. In the illustrated embodiment, the illumination system 7 comprises a plurality of illumination elements 50, such as LEDs, which are covered by lenses 90 and coupled to power modules 60 and controls 80 via a plurality of wires 70 (see FIGS. 7 and 8). The illumination system 7 further comprises lighting guards 95, which protect the illumination elements 50 and lenses 90 from being inadvertently damaged, and hide the illumination elements 50 and lenses 90 from being seen.

The ceiling panel 10 may be a component of a passenger vehicle cabin. In some embodiments, the passenger vehicle comprises an aircraft, such as the aircraft 3, shown in FIG. 9. In other embodiments, the passenger vehicle may comprise a bus, train, ship, or any other suitable passenger vehicle. In the embodiment shown in FIGS. 5A and 5B, the ceiling panel 10 is mounted onto stowage bins 20 (referenced in FIG. 6) or walls of the passenger vehicle cabin by ceiling panel mounts 11, as discussed below.

In some embodiments, the ceiling panel 10 utilizes crush-core interior panels corresponding to the core material 2 of FIG. 1, and a face sheet 18, which corresponds to the face sheet 4 of FIG. 1. The crush-core interior panels comprise a honeycomb structure which provides enough structural strength to support the ceiling panel 10 in a fixed position and to hold electrical components such as illumination elements 50, lenses 90, power modules 60, wires 70, and controls 80.

In some embodiments, the face sheet 18 extends along an upper portion of the ceiling panel 10, extending from a first end portion 13A to a second end portion 13B of the ceiling panel 10. The face sheet 18 preferably comprises a thermally conductive material. For example, in some embodiments, the face sheet 18 comprises pitch-based carbon fiber, which has excellent thermal conduction characteristics. In other embodiments, the face sheet 18 could comprise other thermally conductive materials, such as a conductive graphite sheet, graphite fiber, pitch fiber, carbon fibers impregnated with phenolic, carbon fiber tape or fabric, conductive polymers, carbon foam, aluminum foam, eGRAF®, or metallic encapsulated graphite.

The bottom surface 12 of the ceiling panel 10 is polished in some embodiments, so that light shined onto the bottom surface 12 by the illumination elements 50 is reflected throughout the passenger vehicle cabin. The bottom surface 12 of the ceiling panel 10 may comprise a decorative surface finish to add aesthetic value to the passenger vehicle cabin. Thus, the ceiling panel 10 may comprise a bottom surface 12 which acts as a decorative panel and a face sheet 18 which acts as a heat transfer medium.

Figure 6:
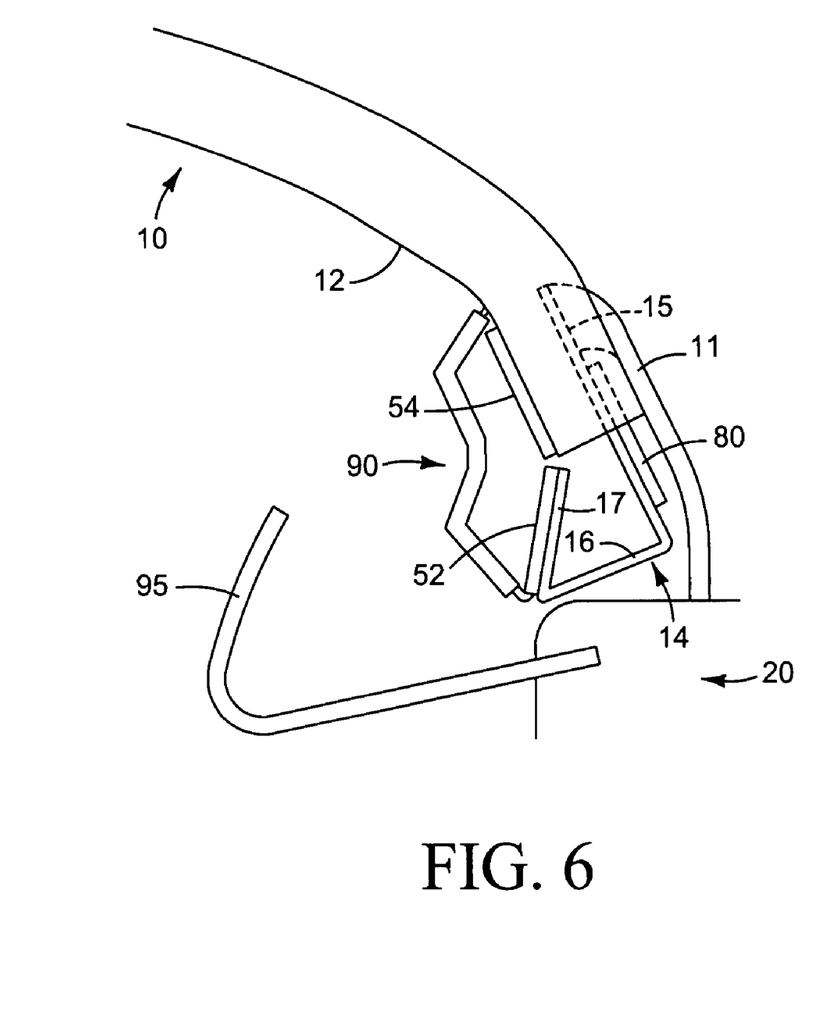
FIG. 6 shows a cross-sectional view of an attachment between the ceiling panel and a stowage bin.

FIG. 6 shows a cross-sectional view of an attachment between the ceiling panel 10 and a stowage bin 20 using a ceiling panel mount 11. In the illustrated embodiment, the ceiling panel mount 11 is removably attached to a platform 14 which comprises a first portion 15, second portion 16, and third portion 17. The attachment is preferably arranged such that the platform 14 does not contact the ceiling panel mount 11, other than at the point of attachment, when the ceiling panel 10 vibrates. Thus, the points of attachment between the ceiling panel mount 11, the platform 14, and the ceiling panel 10 should be the only points of contact between the ceiling panel 10, platform 14, illumination elements 50 or lenses 90, and the ceiling panel mount 11.

Figure 7:
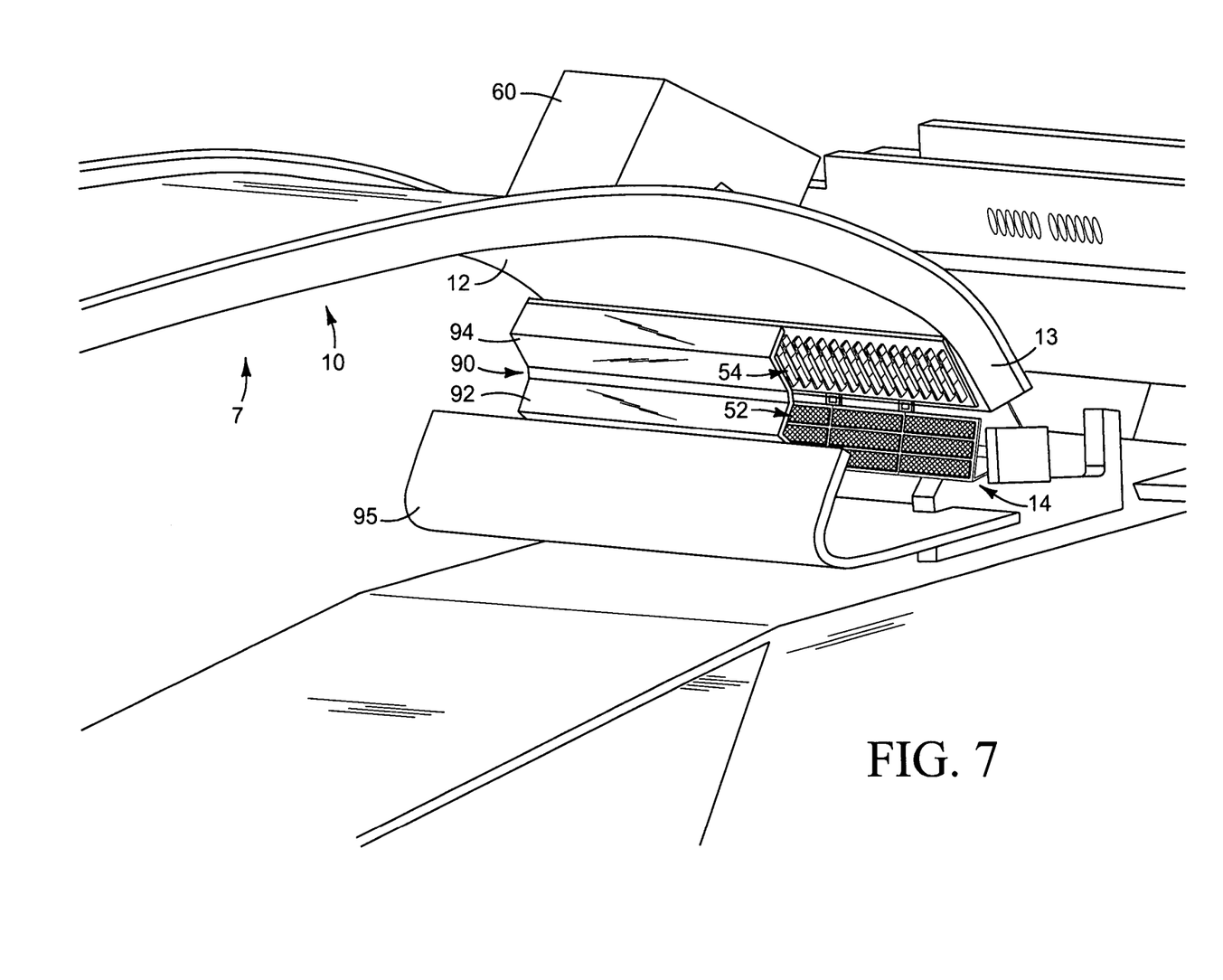
FIG. 7 shows an interior perspective view of the attachment between the ceiling panel and the stowage bin.

FIG. 7 shows an interior perspective view of the attachment between the ceiling panel 10 and the stowage bin 20. As shown in FIG. 7, the illumination elements 50 are covered by lenses 90, which serve to soften the light emitted by the illumination elements 50. The illumination elements 50 are typically mounted onto opposite end portions 13 of the ceiling panel 10. Thus, the ceiling panel 10 of the passenger vehicle cabin may be viewed as a generally planar structure comprising a thermally conductive material with illumination elements 50 attached at opposite end portions 13 of the ceiling panel 10 and in contact with the thermally conductive material.

In the embodiment shown in FIG. 7, the illumination elements 50 are mounted in two horizontal rows, namely a lower horizontal row 52 and an upper horizontal row 54. The lower horizontal row 52 is covered by a lower lens 92, and the upper horizontal row 54 is covered by an upper lens 94. The components are configured so that the light emitted from the upper lens 94 shines generally in the direction of the opposite wall toward the opposite set of illumination elements 50. The components are further configured so that the light emitted from the lower lens 92 shines onto the bottom surface 12 of the ceiling panel 10, which reflects the light throughout the passenger vehicle cabin.

In the embodiment shown in FIG. 7, the upper horizontal row 54 of illumination elements 50 and the upper lens 94 are attached to the end portion 13 of the ceiling panel 10, whereas the lower horizontal row 52 of illumination elements 50 and the lower lens 92 are connected to the platform 14 which extends from the ceiling panel 10. The platform 14 preferably comprises a thermally conductive material, including a non-metallic thermally conductive material such as pitch-based carbon fiber, or could comprise aluminum.

Figure 8:
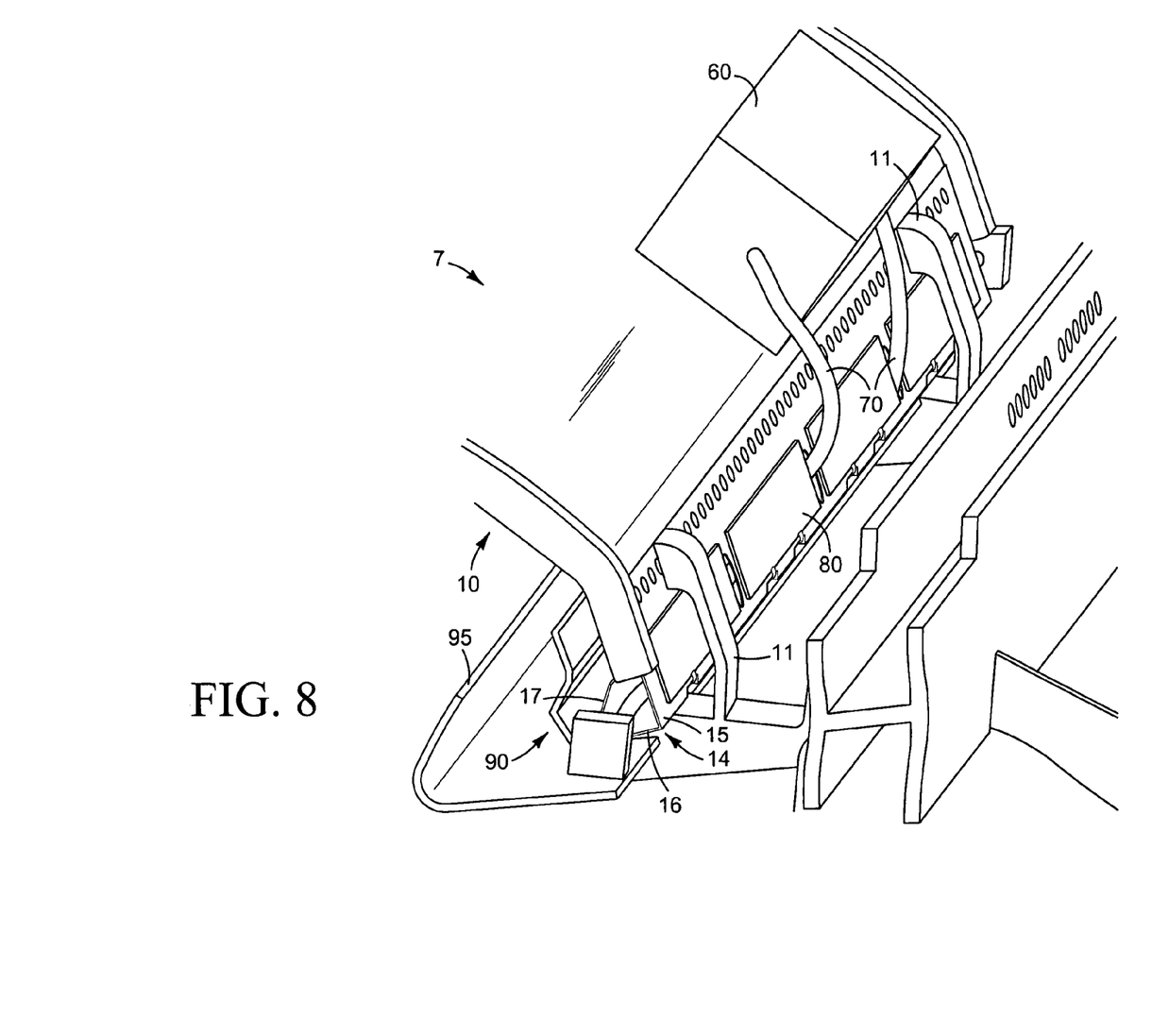
FIG. 8 shows an exterior perspective view of the attachment between the ceiling panel and the stowage bin.

FIG. 8 shows an exterior perspective view of the attachment between the ceiling panel 10 and the stowage bin 20. In this embodiment, the platform 14 is generally U-shaped, comprising a first portion 15, a second portion 16, and a third portion 17. As shown in FIG. 8, the first portion 15 of the platform 14 extends from the ceiling panel 10 in a direction generally parallel to the ceiling panel 10. In the embodiment shown in FIG. 8, the platform 14 then bends inward toward a central area of the passenger vehicle cabin to form the second portion 16, and then bends again back toward the first portion 15 to form the third portion 17. The third portion 17 serves as a mount for the lower horizontal row 52 of illumination elements 50 and the lower lens 92. In other embodiments, the third portion 17 is parallel to the first portion 15 and contacts the upper horizontal row 54, and the upper horizontal row 54 is mounted on the third portion 17.

In the embodiment shown in FIG. 8, the illumination elements 50 are in contact with the platform 14; the upper horizontal row 54 is mounted onto the bottom surface 12 of the ceiling panel 10, and partially in contact with the first portion 15, whereas the lower horizontal row 52 is mounted onto and therefore in contact with the third portion 17. The platform 14 is in contact with the face sheet 18 that is part of, and extends across the top of, the ceiling panel 10. This configuration places the illumination elements 50 in thermal communication with the face sheet 18, enabling heat to be drawn away from the illumination elements 50 into the platform 14, and from the platform 14 into the face sheet 18.

Alternatively, the platform 14 and face sheet 18 may comprise a single component attached to the illumination elements 50 and extending across the top of the ceiling panel 10; in this alternative, the face sheet 18 would extend across the top of the ceiling panel 10 and also be in contact with the illumination elements 50.

As shown in FIG. 8, the illumination elements 50 are connected by wires 70 to a power module 60. In this embodiment, the power module 60 is attached to a top portion of the ceiling panel 10. A controller 80, which controls the illumination intensity of the illumination elements 50, is also mounted onto the ceiling panel 10. Therefore, all lighting components of the illumination system 7 can advantageously be mounted on the ceiling panel 10.

In the described embodiments, heat is drawn away from the illumination elements 50 directly into the face sheet 18. As long as the illumination elements 50 are in thermal communication with or in contact with a thermally conductive material on the ceiling panel 10, the ceiling panel 10 will dissipate heat from the illumination elements 50. Thus, the ceiling panel 10, which comprises the face sheet 18, serves to dissipate heat away from the illumination elements 50. Instead of using a separate dedicated heat sink such as aluminum fins, embodiments of the present application utilize a structural component of the ceiling panel 10 itself as a heat sink. The flat, extended shape of the face sheet 18 allows heat to be quickly dissipated away from the illumination elements 50. The high surface-to-volume ratio of the face sheet 18 allows the face sheet 18 itself to cool off quickly and dissipate more heat from the illumination elements 50. The illumination elements 50 can be attached to the ceiling panel 10 and be in contact with a thermally conductive material that is part of the ceiling panel 10 so that heat will be dissipated away from the illumination elements 50 by the ceiling panel 10.

In addition, because mounting the illumination elements 50 on the ceiling panel 10 instead of the stowage bins 20 allows for decreased fixture slope, less room is required for installation of the lighting system. Mounting the illumination elements 50 on the ceiling panel 10 also improves aesthetics by allowing the ceiling panel 10 to terminate at the illumination elements 50 and lenses 90, rather than in free space.

Although this invention has been described in terms of certain preferred embodiments, other embodiments that are apparent to those of ordinary skill in the art, including embodiments that do not provide all of the features and advantages set forth herein, are also within the scope of this invention. Rather, the scope of the present invention is defined only by reference to the appended claims and equivalents thereof.

What is claimed is:

1. A thermally conductive panel for dissipating heat from a heat source comprising: a honeycomb core interior portion extending between a first end portion and a second end portion of the panel; a non-metallic thermally conductive face sheet extending across an outer surface of the honeycomb core interior portion between the first end portion and the second end portion of the panel, the non-metallic thermally conductive face sheet having a thermal conductivity, along at least one axis extending along the outer surface of the honeycomb core interior portion, of at least about 25 Watts per meter-Kelvin; and a heat source attached to the thermally conductive panel, wherein heat is dissipated from the heat source, into the non-metallic thermally conductive face sheet, and along the non-metallic thermally conductive face sheet along the at least one axis.

2. The thermally conductive panel of claim 1, wherein the face sheet comprises pitch-based carbon fiber.

3. The thermally conductive panel of claim 1, wherein the face sheet has grains which cause the thermal conductivity to be greatest along the at least one axis.

4. The thermally conductive panel of claim 1, wherein the heat source comprises an illumination element, computer, electronic component, or mechanical device.

5. The thermally conductive panel of claim 1, wherein the panel forms a part of a ceiling panel, stowage bin support module, environmental control system, control panel within a flight deck, or electronics bay support structure.

6. The thermally conductive panel of claim 1, wherein the panel forms a part of a passenger vehicle comprising an aircraft, bus, train, or ship.

7. The thermally conductive panel of claim 1, wherein the honeycomb core interior portion does not contain a heat sink.

8. The thermally conductive panel of claim 1, wherein the non-metallic thermally conductive face sheet has a high surface-to-volume ratio to allow the non-metallic thermally conductive face sheet to cool off quickly and to dissipate more heat.

9. The thermally conductive panel of claim 1 wherein the thermally conductive panel is configured to be mounted to different types of heat sources to dissipate heat from the different types of heat sources.

10. An illumination system comprising: a panel comprising a thermally conductive face sheet extending across an outer surface of a honeycomb core interior portion, the panel mounted onto a structure of a passenger vehicle cabin with one or more panel mounts; and a plurality of light-emitting diodes mounted directly onto the panel, such that the light-emitting diodes are in contact with the thermally conductive face sheet which dissipates heat from the light-emitting diodes through the thermally conductive face sheet along at least one axis extending along the outer surface of the honeycomb core interior panel.

11. The system of claim 10, further comprising one or more lenses covering the light-emitting diodes.

12. The system of claim 10, further comprising a power module and a controller in electrical communication with the light-emitting diodes via a plurality of wires.

13. The system of claim 10, further comprising one or more lighting guards.

14. The system of claim 10, wherein the honeycomb core interior portion comprises a crush-core.

15. The system of claim 10, wherein the thermally conductive face sheet comprises pitch-based carbon fiber, conductive graphite, graphite fiber, pitch fiber, carbon fiber impregnated with phenolic, carbon fiber tape, carbon fiber fabric, conductive polymers, carbon foam, aluminum foam, metallic encapsulated graphite, or a non-metallic material having a thermal conductivity of at least 25 Watts per meter-Kelvin.

16. The system of claim 10, wherein the passenger vehicle comprises an aircraft, bus, train, or ship.

17. The system of claim 10, wherein the honeycomb core interior portion does not contain a heat sink.

18. The system of claim 10, wherein the thermally conductive face sheet has a high surface-to-volume ratio to allow the thermally conductive face sheet to cool off quickly and to dissipate more heat.

19. A passenger vehicle comprising: a honeycomb core panel; a non-metallic thermally conductive face sheet extending across an outer surface of the honeycomb core panel; and a heat source in thermal communication with the face sheet, wherein the face sheet dissipates heat from the heat source through the face sheet along at least one axis extending along the outer surface of the honeycomb core panel.

20. The passenger vehicle of claim 19, wherein the heat source is in direct contact with the face sheet.

21. The passenger vehicle of claim 19, wherein the heat source comprises a plurality of light-emitting diodes.

22. The passenger vehicle of claim 21, wherein the heat source further comprises a power module and a controller mounted on the face sheet.

23. The passenger vehicle of claim 19, wherein the thermally conductive face sheet comprises pitch-based carbon fiber, conductive graphite, graphite fiber, pitch fiber, carbon fiber impregnated with phenolic, carbon fiber tape, carbon fiber fabric, conductive polymers, carbon foam, aluminum foam, metallic encapsulated graphite, or a non-metallic material having a thermal conductivity of at least about 25 Watts per meter-Kelvin.

24. The passenger vehicle of claim 19, wherein the passenger vehicle comprises an aircraft, bus, train, or ship.

25. The passenger vehicle of claim 19, wherein the honeycomb core panel does not contain a heat sink.

26. The passenger vehicle of claim 19, wherein the face sheet has a high surface-to-volume ratio to allow the face sheet to cool off quickly and to dissipate more heat.

* * * * *